United States Patent Office 3,824,288
Patented July 16, 1974

3,824,288
SUBSTITUTED HYDRAZINE DERIVATIVES AND
PROCESS FOR THE MANUFACTURE THEREOF
Werner Bollag, Basel, Hugo Gutmann, Reinach, Balthasar Hegedus, Binningen, Ado Kaiser, Lausen, Basel-Land, Albert Langemann, Binningen, Marcel Muller, Frenkendorf, and Paul Zeller, Allschwil, Basel-Land, Switzerland, assignors to Hoffmann-La Roche Inc., Nutley, N.J.
No Drawing. Application June 4, 1970, Ser. No. 43,572, now Patent No. 3,711,543, which is a division of application Ser. No. 571,690, Aug. 11, 1966, now Patent No. 3,534,100, dated Oct. 13, 1970, which in turn is a division of abandoned application Ser. No. 200,059, June 5, 1962. Divided and this application Nov. 21, 1972, Ser. No. 308,627
Claims priority, application Switzerland, June 9, 1961, 6,734/61
Int. Cl. C07c 129/08
U.S. Cl. 260—565       2 Claims

ABSTRACT OF THE DISCLOSURE

Benzene-ring substituted (2-methylhydrazino)-methylbenzene compounds and intermediates therefor are described. The former compounds are useful as cytostatic agents and, particularly, inhibit the growth of transplantable tumors in both mice and rats. Thus, they are active, for example, against Walker tumors, Ehrlich carcinoma and Ehrlich ascites carcinoma.

CROSS-REFERENCE TO RELATED APPLICATIONS

This application is a division of U.S. Patent Application Ser. No. 43,572, filed June 4, 1970, now U.S. Patent No. 3,711,543, issued Jan. 16, 1973, which in turn is a division of U.S. Patent Application Ser. No. 571,690, filed Aug. 11, 1966, now U.S. Pat. No. 3,534,100, issued Oct. 13, 1970, and which in turn is a division of U.S. Patent Application Ser. No. 200,059, filed June 5, 1962, now abandoned.

DETAILED DESCRIPTION OF THE INVENTION

This application relates to novel hydrazine compounds useful as cytostatic agents and, particularly, inhibit the growth of transplantable tumors in both mice and rats. Thus, they are active, for example, against Walker tumors, Ehrlich carcinoma and Ehrlich ascites carcinoma. More particularly, the novel compounds in this invention are selected from the group consisting of compounds of the formula

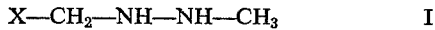

$$X-CH_2-NH-NH-CH_3 \qquad I$$

and pharmaceutically acceptable acid addition salts thereof, wherein X is a phenyl radical bearing substituents selected from the group consisting of amino, acylamino, ureido, (alkylsulfonyl)-amino, guanidino, amidino, aminoalkyl, carbamoyl, allophanoyl, sulfamoyl, alkylsulfonyl, nitro, (2-methylhydrazino)-methyl, acyl, phenyl, alkyl, trifluoromethyl, halogen, hydroxy, alkoxy, alkanoyloxy, mercapto and alkylthio; at least one substituent being selected from the group consisting of amino, acylamino, ureido, (alkylsulfonyl)-amino, guanidino, amidino, aminoalkyl, carbamoyl, allophanoyl, sulfamoyl, alkylsulfonyl, nitro, (2-methylhydrazino)-methyl, acyl and phenyl.

Exemplary of the various phenyl ring substituents comprehended by X in the formula I are the following:

primary, secondary and tertiary amino groups such as amino, lower alkylamino, for example, methylamino, and di-lower alkylamino, for example, dimethylamino, diethylamino;

acylamino groups wherein the acylating moiety can be formed from aliphatic, aromatic or heterocyclic acids and the amino group of which can be primary or secondary such as lower alkanoylamino groups, for example, N-acetyl-N-methylamino, acetylamino and pivaloylamino; acylamino groups wherein the acyl moiety is the residue of a naturally occurring α-amino acid, for example, alanylamino; other aliphatic acylamino groups, for example, succinimido; aroylamino groups, for example, benzoylamino and phthalimido; heterocyclic acylamino groups wherein the hetero moiety is a one to two hetero atom nitrogen and/or oxygen containing 5 to 6 membered heterocyclic ring as well as heterocyclic acylamino groups wherein the heterocyclic ring bears further substituents such as lower alkyl, for example, nicotinoylamino, isonicotinoylamino, (methylisoxazolylcarbonyl)amino and (methyloxazolylcarbonyl)-amino;

uredio groups, the hydrogen atoms of which can be in part or completely replaced by saturated or unsaturated aliphatic, cycloaliphatic, araliphatic, aromatic or heterocyclic radicals which themselves can bear further functional groups, for example, methylureido, isopropylureido;

(alkylsulfonyl)-amino groups, for example, (methylsulfonyl)amino;

guanidino groups, the hydrogen atoms of which can be in part or completely replaced by saturated or unsaturated aliphatic, cycloaliphatic, araliphatic, aromatic or heterocyclic radicals which themselves can bear further functional groups, for example, methyl guanidino, isopropylguanidino, (hydroxyethyl)-guanidino;

amidino groups, the hydrogen atoms of which can be in part or completely replaced by saturated or unsaturated aliphatic, cycloaliphatic, araliphatic, aromatic or heterocyclic radicals which themselves can bear further functional groups, for example, methylamidino, diisopropylamidino, cyclopropylamidino, phenylamidino, benzylamidino, isoxazolylamidino and (hydroxyethyl)amidino;

primary, secondary and tertiary amino-lower alkyl groups, for example, aminomethyl, aminoethyl, aminopropyl, methylaminomethyl, ethylaminoethyl, methylaminopropyl, dimethylaminomethyl, diethylaminoethyl and dimethylaminopropyl;

carbamoyl groups, the hydrogen atoms of which can be replaced by saturated or unsaturated aliphatic or alicyclic radicals which themselves can bear further functional groups or aromatic or heterocyclic radicals, for example, mono and dialkylcarbamoyl such as N-methyl-carbamoyl, N,N-dimethylcarbamoyl, N-isopropylcarbamoyl, N-isobutylcarbamoyl, N-tert.-butylcarbamol, N,N-diisopropylcarbamoyl, N-tert.-amylcarbamoyl, N-tert.-octylcarbamoyl; as well as N-alkoxyalkylcarbamoyl groups such as methoxyethylcarbamoyl; N-hydroxyalkylcarbamoyl, such as hydroxyethylcarbamoyl; N-alkylthioalkylcarbamoyl groups such as methylthioethylcarbamoyl; N-carbamoyl-alkylcarbamoyl groups such as carbamoyl, methylcarbamoyl; N-alkylsulfonylalkylcarbamoyl groups such as methylsulfonylethyl carbamoyl; N-haloalkylcarbamoyl groups such as β-chloroethylcarbamoyl and β,β,β-trifluoroethylcarbamoyl; N-alkenylcarbamoyl groups such as N-allylcarbamoyl; N-aralkylcarbamoyl groups such as benzylcarbamoyl; N-furfurylcarbamoyl; N-cycloalkylcarbamoyl groups such as N-cyclopropylcarbamoyl; N-alkylaminoalkylcarbamoyl and N-dialkylaminoalkylcarbamoyl groups such as β-methylaminoethylcarbamoyl and diethylaminoethylcarbamoyl; and N,N-alkylenecarbamoyl groups such as N,N-tetramethylenecarbamoyl and N,N-pentamethylenecarbamoyl;

allophanoyl groups, the hydrogen atoms of which can be in part or completely replaced by saturated or unsaturated aliphatic, cycloaliphatic, araliphatic, aromatic or heterocyclic radicals which themselves can bear further functional groups, for example, 4-methylallophanoyl, 2-isopropylallophanoyl;

sulfamoyl groups, the hydrogen atoms of which can be substituted by alkyl groups such as lower alkyl groups, for example, N,N-dimethylsulfamoyl;

lower alkylsulfonyl groups, for example methylsulfonyl;

nitro;

(2-methylhydrazino)-methyl;

acyl radicals of lower aliphatic carboxylic acid, for example, formyl, acetyl and propionyl, and of aromatic carboxylic acids, for example, benzoyl;

phenyl radicals, either unsubstituted or bearing one of the above-named substituents, for example, (2-methylhydrazinomethyl)-phenyl, carbamoylphenyl and acylaminophenyl such as [(5-methyl-3-isoxazolylcarbonyl)-amino]-phenyl and ureidophenyl;

lower alkyl groups, for example, methyl, ethyl and isopropyl;

trifluoromethyl;

halo;

hydroxy and esterified (for example, with lower alkanoic acids such as acetic acid and aralkanoic acids such as benzoic acid) and etherified (for example, with lower alkyl, lower alkenyl and ar-lower alkyl groups) hydroxy, for example, acetoxy, benzoyloxy, methoxy, allyloxy and benzyloxy;

mercapto and lower alkylthio, for example, methylthio and butylthio.

The compounds within the scope of formula I above are classifiable into subgenera as represented by the following formulae

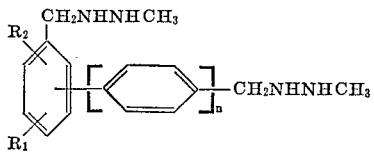

II wherein $n$ is a whole integer from 0 to 1, $R_1$ and $R_2$ are each selected from the group consisting of hydrogen, phenyl, benzoyl, lower alkanoyl, lower alkoxy and lower alkylenedioxy;

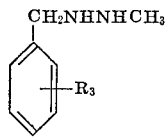

III wherein $R_3$ is selected from the group consisting of nitro, amidino, guanidino, benzoyl, amino, lower alkylamino, and di-lower alkylamino;

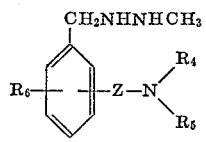

IV wherein Z is selected from the group consisting of carbonyl and sulfonyl; $R_6$ is selected from the group consisting of hydrogen and halogen; and $R_4$ and $R_5$ are selected from the group consisting of, taken separately, hydroxy-lower alkyl, lower alkanoyloxy-lower alkyl, di-lower alkylamino-lower alkyl, phenyl-lower alkyl, hydrogen, lower alkoxy-lower alkyl, pyridylmethyl, furfuryl, lower alkyl, the residue of a naturally occurring α-amino acid devoid of its α-amino group, cyclo-lower alkyl, carbamoyl, lower alkylcarbamoyl and halo-lower alkyl, and taken together, lower alkylene and lower alkyleneoxy-lower alkylene; and

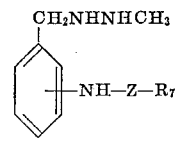

IV wherein Z is selected from the group consisting of carbonyl and sulfonyl; and $R_7$ is selected from the group consisting of lower alkyl, the residue of a naturally occurring α-amino acid devoid of its carboxyl group, phenyl, amino, lower alkylamino, di-loweralkylamino, hydroxy-lower alkylamino, a 5 to 6 membered heterocyclic ring containing one to two hetero atoms selected from the group consisting of nitrogen and oxygen, and a said heterocyclic ring bearing a lower alkyl substituent.

The compounds of formula I can be prepared by aralkylation of a compound of the formula $$CH_3-NH-NH_2 \qquad VI$$

wherein the hydrogen atoms of the hydrazine group may partially be substituted by protecting groups such as acyl, carbalkoxy, carbobenzoxy of benzyl, with a compound yielding the moiety

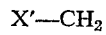     VII wherein X' has the same meaning as X or is a substituent convertible into a substituent represented by X in formula I; or by methylation of a compound of the formula

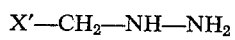     VIII wherein X' has the same meaning as indicated above and the hydrogen atoms of the hydrazine group may partially be substituted by protecting groups such as acyl, carbalkoxy, carbobenzoxy or benzyl; if necessary converting the moiety X' in the resulting hydrazine into a moiety represented by X; if necessary splitting off such protecting groups as are present; and if desired converting the so-obtained product of formula I into a salt.

One embodiment of the invention consists of aralkylating methylhydrazine or a methylhydrazine, the nitrogen atoms of which are partially substituted by protecting groups, with an agent yielding the residue X'—CH$_2$—. This aralkylation can be effected, for example, by use of the following aralkylating agents: 4-carbamoylbenzyl bromide, 4-cyanobenzyl bromide, 4-carbalkoxybenzyl bromide, 2-cyanobenzyl bromide, 4-nitrobenzyl bromide, 3-nitrobenzyl bromide, 4-carbamoyl-2-chlorobenzyl bromide, 4-acylaminobenzyl bromide, 1,2-bis-(bromomethyl)-benzene, 4,4'-bis-(chloromethyl)-biphenyl, 4-benzoylbenzyl bromide, 4-acetylbenzyl bromide, and the like. When using a dihalo compound as aralkylating agent it is convenient to use two moles of methylhydrazine, thereby forming compounds bearing two methylhydrazino groups.

It is suitable in order to effect aralkylation to first convert the hydrazine compound of formula VI above into a salt, preferably via treatment with an alkali metal alcoholate in an alcoholic solution. After removal of the alcohol, the resulting salt is advantageously dissolved in an inert solvent, for example, dimethylformamide, and treated with an aralkylating agent, preferably at an elevated temperature. The reaction product can be purified by conventional methods, for example, via extraction, crystallization or distillation.

The introduction of the aralkyl moiety can also be effected by a reaction of methylhydrazine or methylhydrazine partially substituted by protecting groups, for example, 1-methyl-1-acetyl-hydrazine with a carbonyl compound, followed by reduction of the so-formed hydrazone, as well as eventual splitting off of the protecting groups. This reaction can suitably be effected via a short heating of the reaction components in a solvent, such as, for example, alcohol, and reduction of the resulting hydrazone in the presence of a hydrogenation catalyst, such as palladium or platinum.

According to a further variation of the reaction, there is aralkylated with an agent yielding the moiety

X'—CH$_2$— a compound of the formulae

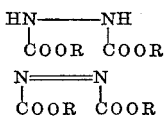

wherein R represents lower alkyl, which has been methylated. Following the aralkylation, the carbalkoxy substituents are split off. The aralkylation can be undertaken in the same manner as previously described.

According to another embodiment of the invention, hydrazine compounds of formula VIII are methylated. This methylation can be conducted, for example, with the help of a methylating agent, such as, methyliodide or dimethylsulphate, under the conditions previously described for the aralkylation reaction.

The introduction of the methyl group can also be effected via reaction of a compound of formula VIII above with formaldehyde, followed by reduction of the condensation product. Condensation is suitably effected with equimolar amounts of the hydrazine of formula VIII and of the formaldehyde. The hydrogenation of the condensation product can proceed simultaneously with the condensation reaction or subsequent thereto. Advantageously, it is conducted in the presence of a hydrogenation catalyst, such as platinum or palladium, until the absorption of an equimolar amount of hydrogen. The working up of the reaction mixture can be effected by conventional means, for example, via fractional distillation.

Products of formula I above can also be obtained via methylation of a product obtained via aralkylation of a compound of formulae IX or X above.

Any protecting groups present in the reaction products can be split off according to known procedures.

The reaction products formed by the above outlined processes can, if desired, be additionally substituted in the phenyl ring. Thus, for example, compounds of formula I above, the hydrazine group of which is provided with protecting groups such as those previously described, can be nitrated, for example, via treatment with potassium nitrate in concentrated sulfuric acid at a temperature of from about 0° C. to about 70° C. Via reaction with chlorine or bromine in the presence of a suitable catalyst, for example, ferric chloride, at slightly elevated temperatures, halogen atoms can be introduced as substituents on the benzene nucleus.

Where necessary, the conversion of the moiety X' into the moiety X can be effected in the above described reaction procedures at any point of time. Thus, it is advantageous, for example, to prepare substituted carbamoyl compounds from 4-[(2-methyl-1,2-dicarbobenzoxy-hydrazino)-methyl]-benzoic acid, itself obtained by a saponification of corresponding methyl or ethylesters, via reaction with amines in accord with known methods, of amidation. Suitably, the acid is converted into a reactive derivative, for example, into an acid chloride or a mixed anhydride, for example, with a carbonic acid monoester or into an activated ester, for example, a cyanomethylester. The acid can also be amidated directly via use of a condensation agent such as dicyclohexylcarbodiimide. The above-mentioned amides can also be obtained in the presence of a strong acid from [(2-methyl-1,2-dicarbobenzoxy - hydrazino)-methyl]-benzonitrile via reaction with olefins, for example, isobutylene or secondary or tertiary alcohols. Hydrolysis of the nitriles by means of strong acids or with hydrogen peroxide and alkalis produces N-unsubstituted benzamides. Protecting groups are subsequently removed from carbamoyl compounds obtained according to this method via hydrogenolysis or treatment with a hydrogen bromide/glacial acetic acid solution. The resulting hydrobromides obtained by the latter method can, if desired, be converted into corresponding free bases and/or into other salts.

The acylamino substituted compounds of the invention (cf., for example, formula V above) are preferably prepared via acylation of, for example, 1-methyl-1,2-dicarbobenzoxy-2-(p-aminobenzyl)-hydrazine, which itself, for example, can be obtained via reduction of the corresponding nitro or azo compound. The acylation can be effected, for example, by use of a reactive derivative of the desired carboxylic acid or sulfonic acid, or from the free acid by use of a condensation agent such as dicyclohexylcarbodiimide. The subsequent removal of the protecting groups can be effected in ways known per se; for example via hydrogenolysis or hydrolysis with hydrogen bromide in glacial acetic acid. Accessible from the same intermediate amino compounds are ureido compounds via treatment with cyanates or isocyanates, as well as guanidines by treatment with cyanamide and its derivatives (for example, methylisothiourea sulphate).

Amidino or substituted amidino compounds of formula I are advantageously prepared from methylhydrazinomethyl-benzonitriles, the hydrazines group of which is substituted by protecting groups, via the corresponding imido ether, which can be obtained via reaction of the nitrile with alcohol and mineral acid. By reaction of the imido ether with ammonia or a primary or secondary amine, the desired amidino compound is obtained. Suitably protected methylhydrazinomethyl-benzonitriles can also be reacted directly with salts of amines, for example, isopropyl amine hydrochloride or isopropylamine tosylate at elevated temperatures, and the desired products of formula I can be obtained via subsequent removal of the protecting groups. One further method consists of converting a mono-substituted methyl hydrazinomethyl-benzamide, the hydrazine groups of which is substituted by protecting groups, for example, 4-[(2-methyl-1,2-dicarbobenzoxy-hydrazino)-methyl]-benzoic acid isopropylamide, via reaction with a phosphorus halide, for example, phosphorus pentachloride, into corresponding imido halides, which then, in turn, can be reacted with ammonia, primary, or secondary amines, whereby there is obtained upon removal of the protecting groups, amidines and mono-or disubstituted amidines.

The substituted aromatic hydrazine compounds of formula I form pharmaceutically acceptable acid addition salts with both pharmaceutically acceptable inorganic and organic acids, such as, for example, hydrohalic acids, as hydrogen chloride, hydrogen bromide, hydrogen iodide, as well as other mineral acids, such as sulfuric acid, phosphoric acid, nitric acid, and with organic acids, such as tartaric acid, citric acid, oxalic acid, camphorsulfonic acid, ethanesulfonic acid, toluenesulfonic acid, salicylic acid, ascorbic acid, maleic acid, mandelic acid, and the like. Preferred salts are the hydrohalides, especially the hydrochlorides. The acid addition salts can suitably be prepared via treatment of the hydrazine derivative in an inert solvent with the corresponding acid.

The compounds of formula I are active cytostatic agents, as described above. Also, these compounds cause decomposition of macromolecular desoxyribonucleic acid in solution. The compounds can be administered internally in the form of conventional pharmaceutical preparations, for example the bases of formula I or their pharmaceutically acceptable acid addition salts can be administered in conventional enteral or parenteral pharmaceutical excipients containing organic and/or inorganic inert carriers, such as water, gelatin, lactose, starch, magnesium stearate, talc, plant oils, gums, alcohol, Vaselines, or the like. The pharmaceutical preparations can be in conventional solid forms, for example, tablets, dragées, suppositories, capsules, or the like, or conventional liquid forms, such as suspensions, emulsions, or the like. If desired, they can be sterilized and/or contain conventional pharmaceutical adjuvants, such as, preservatives, stabilizing agents, wetting agents, emulsifying agents, buffers, or salts used for the adjustment of osmotic pressure. The pharmaceutical preparations can also contain other therapeutically active materials.

The following examples are illustrative, but not limitative of the invention. All temperatures are in degrees centigrade.

EXAMPLE 1

To a suspension of 4.8 g. of sodium hydride and 200 ml. of dimethylformamide there was added dropwise in the course of 30 minutes a solution of 45.4 g. of 1,4-bis-[(1,2 - dicarbethoxy-hydrazino)-methyl]-benzene in 150 ml. of dimethylformamide. The resulting mixture was stirred for a further 3 hours and then 30 g. of methyl iodide were added at one time to the turbid solution. The reaction mixture was then heated for 4 hours at 100°. After cooling, the reaction mixture was distilled under reduced pressure, the residue taken up in 300 ml. of chloroform, the resulting solution twice shaken each time with 200 ml. of water, the chloroform phase dried over sodium sulfate, filtered and the solvents evaporated yielding 1,4-bis - [(2 - methyl-1,2-dicarbethoxy-hydrazino)-methyl]-benzene, which upon being twice recrystallized from methanol melted at 102°.

The so-obtained product was then heated on a steam bath for 7 hours with 300 ml. of aqueous concentrated hydrochloric acid. The resulting clear solution was concentrated and the residue twice recrystallized from methanol, yielding 1,4-bis-[(2-methyl-hydrazino)-methyl]-benzene dihydrochloride melting at 212–214°.

The starting material used above was prepared as follows: 10.6 g. of p-xylene and 8.7 g. of azodicarboxylic acid ethyl ester were heated together under a nitrogen atmosphere at 140–150° for 72 hours. During this time, there was thrice added to the reaction mixture, at intervals of 12 hours, three portions of 8.7 g. of azodicarboxylic acid ethyl ester. After the heating, the unreacted starting material was distilled off under reduced pressure, and the residue which had been distilled over was digested with hot petroleum ether and the precipitated crystals recrystallized four times from benzene, yielding 1,4-bis-[(1, 2 - dicarbethoxy-hydrazino)-methyl]-benzene melting at 149–151°.

Example 2

A mixture of 26 g. of 1-methyl-1,2-diacetyl-hydrazine and 30 ml. of absolute ethanol was poured into a solution of 4.6 g. of sodium in 120 ml. of absolute ethyl alcohol maintained at 20° and immediately thereafter 25 g. of 1,2-bis-(bromo methyl)-benzene were added to the reaction mixture.

After being heated for 2 hours under reflux, the reaction mixture was cooled down, the solvents were evaporated under reduced pressure and the residue was partitioned between 75 ml. of water and 200 ml. of methylene chloride. The aqueous phase was separated and again extracted, this time with 100 ml. of methylene chloride. The combined methylene chloride extracts were then washed with 100 ml. of water, dried over sodium sulfate, evaporated under reduced pressure and the reaction product isolated via distillation, yielding the tetraacetyl derivative of 1,2-bis-[(2-methyl-hydrazino)-methyl]-benzene as an almost colorless viscous oil boiling at 246°/0.08 mm. Hg which congealed in the cold to a glassy material. 30 g. of this product was then covered with 150 ml. of aqueous concentrated hydrochloric acid and the mixture heated on a steam bath under a nitrogen atmosphere for 75 minutes. While doing so, the mixture was shaken from time to time. The clear brown solution was then concentrated under reduced pressure and the precipitated crystalline residue recrystallized three times from ethyl alcohol, each time with treatment with animal charcoal. The 1,2-bis-[(2-methyl-hydrazino)-methyl]-benzene dihydrochloride thus obtained melted at 117–120°. The free base obtained in the usual way from the dihydrochloride distilled over as a light brown oil boiling at 125°/0.08 mm. Hg.

In an analogous manner, the following compounds were prepared:

1,4-bis-[(2-methyl-hydrazino)-methyl]-benzene dihydrochloride, which melted at 212–214° (dec.);
1,3-bis-[(2 - methyl-hydrazino)-methyl]-benzene, which boiled at 128°/0.1 mm. Hg;
4,4'-bis-[(2-methyl-hydrazino)-methyl]-biphenyl dihydrochloride, which melted at 253–255°;
2,2'-bis-[(2-methyl-hydrazino)-methyl]-biphenyl dihydrochloride, which melted at 188–189°;
3,3'-bis-[(2-methyl-hydrazino)-methyl]-biphenyl dihydrochloride which melted at 172–174°;
2,3-bis-[(2-methyl-hydrazino)-methyl]-biphenyl dihydrochloride, which melted at 217–218° (dec.);
3,4-bis-[(2-methyl-hydrazino)-methyl]-biphenyl dihydrochloride, which melted at 136–140° (dec.);
4-[(2-methyl-hydrazino)-methyl]-biphenyl hydrochloride, which melted at 195–196°;
4-[(2 - methyl-hydrazino)-methyl]-benzophenone hydrochloride, which melted at 147–149°;
4-[(2 - methyl-hydrazino)-methyl]-acetophenone hydrochloride, which melted at 138–140°;
1,2-bis-[(2 - methyl-hydrazino)-methyl]-4,5-methylenedioxybenzene dihydrochloride, which melted at 182–184°;
1,2-bis-[(2-methyl-hydrazino)-methyl] - 4,5 - dimethoxybenzene dihydrochloride, which melted at 182–184°.

Example 3

A mixture of 44 g. of 1-methyl-1,2-diacetyl hydrazine and 80 ml. of absolute ethanol was added to a solution of 7.7 g. of sodium in 200 ml. of absolute ethyl alcohol. 57 g. of 4-nitro-benzyl chloride in 60 ml. of dimethylformamide were then added dropwise thereto in the course of 30 minutes with stirring and heating. The reaction mixture was then heated for 1 hour, cooled to 0°, the separated precipitate filtered off and twice washed, each time with 100 ml. of ethanol. The filtrate was then evaporated in vacuo and the residue partitioned between 200 ml. of water and 300 ml. of methylene chloride. The aqueous phase was separated, and again extracted, this time with 200 ml. of methylene chloride. The methylene chloride extracts were then washed with 200 ml. of 2N sodium hydroxide and 200 ml. of water, dried over sodium sulfate and concentrated. The residue was recrystallized from chloroform/ethanol yielding 1-methyl-2-(4-nitro-benzyl)-1,2-diacetyl-hydrazine, which melted at 141–142°.

10 g. of this product were dissolved in 50 ml. of concentrated hydrochloric acid, the solution diluted with 40 ml. of water and warmed on a water bath under a nitrogen atmosphere for 1½ hours. The reaction mixture was then concentrated in vacuo, and the residue recrystallized from methanol yielding 1-methyl-2-(4-nitrobenzyl)-hydrazine hydrochloride melting at 168–170°.

Example 4

24.7 g. of 1-methyl-1,2-diacetyl-hydrazine were added to a solution of 4.38 g. of sodium in 150 ml. of absolute ethanol and 27.5 g. of 2-cyano-benzyl chloride were then added to the resulting mixture, which was then heated under reflux for 4 hours. The precipitated salt was filtered off and the filtrate concentrated in vacuo. The residue was treated with water and extracted over 15 hours with a mixture of ether and methylene chloride (2:1). Concentration of the extract yielded a residue that was heated under a nitrogen atmosphere for 2 hours with a mixture of 85 ml. of concentrated hydrochloric acid and 67 ml. of water. The reaction solution was then concentrated and rendered alkaline by addition of sodium hydroxide, whereupon 2-[(2-methyl-hydrazino)-methyl]-benzamide separated out. The dihydrobromide prepared therefrom was crystallized from glacial acetic acid and melted at 240–242°.

Example 5

A solution of 25.4 g. of 1-methyl-1,2-dibenzoyl-hydrazine in 50 ml. of dimethylformamide was added dropwise, with stirring and cooling at 20–30°, to a suspension of 2.4 g. of sodium hydride in 50 ml. of dimethylformamide. 17.2 g. of 3-nitrobenzyl chloride was then added to the reaction mixture, and the resulting mixture permitted to stand overnight at room temperature. The greater part of the dimethylformamide was then distilled off under reduced pressure, the residue poured into 1N sodium hydroxide, extracted with ether, the eluate washed with 1N sodium hydroxide and with water, and the so-obtained ether phase dried over sodium sulfate and evaporated. The residue was then twice decanted each time with 0.5 liter of low boiling petroleum ether. The petroleum ether insoluble part, a viscous yellow oil, consisted of crude 1 - methyl-2-(3-nitro-benzyl)-1,2-dibenzoyl-hydrazine. Without further purification, this crude product was dissolved in 200 ml. of acetic acid and the resulting solution, after addition of 200 ml. of concentrated hydrochloric acid, boiled for 2 hours under a nitrogen atmosphere. The concentrate obtained by evaporation under reduced pressure was then partitioned between water and ether. The aqueous phase was separated, evaporated under reduced pressure and concentrated in vacuo and the so-obtained crystals were dried over potassium hydroxide and recrystallized from ethanol/ether, yielding 1-methyl-2-(3-nitro-benzyl)-hydrazine monohydrochloride melting at 153–155°.

Example 6

First, 2.05 g. of sodium and then 28 g. of 1-methyl-1,2-dicarbobenzoxy-hydrazine were dissolved in 150 ml. of absolute ethanol, and the solution was evaporated to dryness under reduced pressure. The residue was dissolved in 100 ml. of dimethylformamide, and to this solution were added at one time with stirring 20.5 g. of 4-(bromomethyl)-benzamide. The reaction was exothermic and the temperature of the reaction mixture rose to about 60°. The reaction mixture was stirred for 2 hours, then poured into 500 ml. of water and extracted three times with ether/methylene chloride (3:1). The organic extracts were washed 5 times with water, dried with sodium sulfate and evaporated to dryness in vacuo. The residual oil was dissolved in 180 ml. of a 33% solution of hydrogen bromide in glacial acetic acid, and the resulting solution permitted to stand for 4 hours at room temperature. The crystals that separated were filtered off, washed with glacial acetic acid and ether, and recrystallized from ethanol, yielding 4-[(2-methyl-hydrazino)-methyl]-benzamide hydrobromide, melting at 173–175°.

In an analogous manner, the following compounds were prepared:

3-[(2-methyl-hydrazino)-methyl]-benzamide hydrobromide, melting at 142–143°.
4-[(2-methyl-hydrazino)-methyl]-benzoic acid methylamide hydrobromide, melting at 186–187°.
4-[(2-methyl-hydrazino)-methyl]-benzenesulfonic acid dimethyl amide dihydrobromide, melting at 126–128°.
4-[(2-methyl-hydrazino)-methyl]-3-chloro-benzamide hydrobromide, melting at 197–199°.

Example 7

A solution of 2.3 g. of sodium in 150 ml. of absolute ethanol was treated with 31.4 g. of 1-methyl-1,2-dicarbobenzoxy-hydrazine and then with a solution of 18.3 g. of 3-acetamidobenzyl chloride in 50 ml. of absolute ethanol. The mixture was then heated to a boil with stirring for 2½ hours, cooled and evaporated in vacuo. The oily residue was partitioned between methylene chloride and water, and worked up as usual. The crude 1-methyl-2-(3-acetamido-benzyl)-1,2-dicarbobenzoxy-hydrazine was hydrogenated in 200 ml. of methanol with palladium carbon as the catalyst. After termination of the hydrogen absorption, the solvent was evaporated off, the residue taken up in 50 ml. of absolute ethanol and treated with a solution of 12.6 g. of oxalic acid and alcohol. The first colloidal precipitate was rendered solid by trituration with methanol and then recrystallized from methanol/ether, yielding 1-methyl-2-(3-acetamido-benzyl)-hydrazine oxalate, melting at 175° (dec.).

In a similar 1-methyl-2-(2-acetamido-benzyl)-hydrazine hydrochloride melting at 162° was obtained.

Example 8

A mixture of 12 g. of methylhydrazine, 37.3 g. of 4-dimethylaminobenzaldehyde, 200 ml. of ethanol and 0.5 ml. of acetic acid was heated under a nitrogen atmosphere to the boiling point for 5 minutes. After cooling to 20° and without isolation of the intermediate hydrazone, the reaction mixture was hydrogenated under normal conditions in the presence of 2 g. of platinum in the form of platinum oxide (Adams catalyst). The hydrogenation was interrupted after the uptake of 6.5 liters of hydrogen, the catalyst filtered off, rinsed with 20 ml. of ethanol, and the purified filtrate along with the rinse ethanol concentrated at 40° (bath temperature)/12 mm. Hg. The oily brown colored residue was purified by fractional distillation under a nitrogen atmosphere, yielding 1-methyl-2-(4 - dimethylamino-benzyl-hydrazine, which boiled at 131°/0.3 mm. Hg and formed a colorless oil unstable in air.

In a similar manner, there was prepared 1-methyl-2-(4-amino-benzyl)-hydrazine, which boiled at 123–124°/0.4 mm. Hg.

Example 9

A mixture of 37.6 g. of 3-nitro-benzaldehyde, 100 ml. of methylalcohol, 50 ml. of aqueous methylhydrazine solution (obtained from 26 g. of methylhydrazine) and 1 ml. of acetic acid were heated to boil for 10 minutes. The deep red colored solution was cooled to 4° and permitted to stand overnight. The crystals that separated were filtered off, washed with 90% aqueous ethanol and dried in vacuo. The filtrate and wash liquid were concentrated under reduced pressure to about ½ their volume. Upon cooling, further substance crystallized out. The crude dried 1-methyl-2-(3-nitro-benzylidene)-hydrazine was twice recrystallized from ether/petroleum ether and melted at 66°.

17.6 g. of this product in 100 ml. of ethyl acetate was hydrogenated in the presence of 2 g. of palladium-carbon (10%) under normal conditions. After the uptake of the calculated amount of hydrogen, the hydrogenation was interrupted, catalyst filtered off and the filtrate concentrated at 40° (bath temperature)/12 mm. Hg. The oily residue was purified via distillation under a nitrogen atmosphere, yielding 1 - methyl - 2-(3-amino-benzyl)-hydrazine as a colorless viscous oil, which distilled over at 113–115°/0.05 mm. Hg pratically free of any residue.

In an analogous manner, the following products were prepared:

1-methyl-2-(2-amino-benzyl)-hydrazine, which boiled at 93°/0.02 mm. Hg.
1-methyl-2-(4-amino-benzyl)-hydrazine, which boiled at 123–124°/0.04 mm. Hg.

Example 10

14.92 g. of 4-dimethylamino-benzaldehyde in 100 ml. of ethyl alcohol were added to an aqueous acetic acid solution of 1-methyl-1-acetyl-hydrazine. The reaction mixture was then heated to a boil for 5 minutes, the clear red solution cooled down and the separated crystals of 1-methyl-2-(4-dimethylaminobenzylidene)-1 - acetyl - hydrazine filtered off. This intermediate was twice recrystallized from methanol and melted at 127–129°.

10.9 g. of this hydrazone were dissolved in 250 ml. of ethanol and hydrogenated under normal conditions in the presence of 0.5 g. of platinum castalyst. Hydrogenation came to a standstill after the absorption of the calculated amount of hydrogen. The catalyst was then filtered off, the filtrate evaporated under reduced pressure and the residue, which formed upon cooling of the concentrate, recrystallized twice from ether/petroleum ether, yielding 1 - methyl - 2 - (4 - dimethylamino-benzyl)-1-acetyl-hydrazine melting at 73–74°.

39 g. of this acetyl compound were added to a solution of 40 g. of potassium hydroxide in 40 ml. of absolute ethanol, and the mixture boiled for 6 hours under a nitrogen atmosphere. The reaction mixture was then concentrated to about 100 ml., treated with an equal amount of water, saturated with potassium carbonate and three extracted, each time with 500 ml. of ether. The purified ether extracts were dried over potassium carbonate and evaporated to dryness under reduced pressure. The residue was taken up in 500 ml. of benzene, dried for 2 hours over sodium sulfate in the presence of animal charcoal, filtered, and the filtrate concentrated under reduced pressure, yielding 1 - methyl-2-(4-dimethylamino-benzyl)-hydrazine as a light yellow colored oil, which boiled at 131°/0.3 mm. Hg; $n_D^{22}=1.5704$.

Example 11

First 0.62 g. of sodium and then 8.8 g. of 1-methyl-1,2-dicarbobenzoxy-hydrazine were dissolved in 50 ml. of absolute ethanol and the solution evaporated to dryness under reduced pressure. The residue was dissolved in 50 ml. of dimethylformamide and treated with a solution of 98. g. of N - (N - carbobenzoxy-DL-α-alanyl)-4-chloro methyl-aniline in 20 ml. of dimethylformamide. After 10 minutes, the reaction mixture reacted neutral. It was then poured in water and, extracted with methylene chloride, the extract was washed with water and dried with sodium sulfate. The methylene chloride was distilled off in vacuo, the residual oil dissolved in 300 ml. of methanol and hydrogenated in the presence of palladium-carbon until the carbobenzoxy groups were completely split off. After the catalyst was filtered off, the filtrate was adjusted to a pH of 5 with alcoholic hydrochloric acid, concentrated to a small volume in vacuo and treated with ethyl acetate. The precipitated hydrochloride of 1 - methyl - 2[4 - (DL-α-alanyl-amino)-benzyl]-hydrazine was an amorphous hygroscopic powder, which decomposed at 95–100°.

There was obtained in an analogous manner:

1 - methyl - 2 - [4-(L-α-alanyl-amino)-benzyl]-hydrazine hydrochloride, which decomposed between 100 and 110°, $[\alpha]_D = +24.5°$ (c.=1 in water).

Example 12

31.4 g. of 1-methyl-1,2-dicarbobenzoxy-hydrazine were added portionwise, with stirring at 25–30°, to a suspension of 2.4 g. of sodium hydride in 100 ml. of dimethylformamide. The reaction mixture was then stirred until the hydrogen evolution had terminated and all the material had gone into solution. A solution of 23 g. of 4-phenylazo-benzyl chloride in 100 ml. of dimethylformamide was then added dropwise thereto, with stirring, in the course of 30 minutes. After the addition was terminated, the mixture was stirred for a further 2 hours at 80°, then cooled and the solvents evaporated off in vacuo as far as possible. The deep red oily residue was partitioned between 300 ml. of water and 400 ml. of methylene chloride. The methylene chloride solution was washed with 200 ml. of water, dried over sodium sulfate and concentrated in vacuo. The oily residue was taken up in 100 ml. of ethyl acetate, the resulting solution evaporated in vacuo, the residue dissolved in 300 ml. of ethyl acetate and hydrogenated with 5 g. of Raney nickel under normal conditions. After the absorption of 4.9 liters of hydrogen, the hydrogenation came to a standstill, whereupon the catalyst was filtered off and the colorless filtrate evaporated in vacuo. The oily residue was extracted with boiling petroleum ether B.P. 40–45°) until no more aniline could be detected. The petroleum ether insoluble part was dissolved in ether and shaken with 100 ml. of 3N hydrochloric acid, whereupon there precipitated a heavy, water and ether insoluble oil, which was separated and stirred with 3N sodium hydroxide until the mixture was strongly alkaline. It was then extracted with ether, the ether solution washed neutral with water and dried with sodium sulfate. By distillation, there was obtained 1 - methyl - 2 - (4 - amino-benzyl)-1,2-dicarbobenzoxy-hydrazine as a yellow viscous oil, which was sufficiently pure for further reaction. It was then dissolved in 100 ml. of a 33% solution of hydrogen bromide in glacial acetic acid and permitted to stand for 4 hours at room temperature. The precipitated crystals were then filtered off, washed in glacial acetic acid and ether, and recrystallized from ethanol/acetonitrile/ether, yielding 1-methyl - 2 - (4 - aminobenzyl) - hydrazine hydrabromide, which melted at 130–134° (dec.).

Example 13

A solution of 8.9 g. of 5-methyl-3-isoxazole-carbonyl chloride in 30 ml. of absolute benzene was added dropwise, with stirring, so that the temperature did not rise over 40°, to a solution of 20 g. of 1-methyl-2-(4-amino-benzyl) - 1,2-dicarbobenzoxy-hydrazine in 30 ml. of absolute pyridine. After the addition, the reaction mixture was stirred for 16 hours at room temperature and then treated with 200 ml. of water. The aqueous phase was twice extracted, each time with 300 ml. of benzene. The benzene extracts were extracted 3 times, in all with 400 ml. of 2N hydrochloric acid, then with 200 ml. of water and finally twice with a total of 300 ml. of saturated sodium bicarbonate solution, then dried over sodium sulfate and evaporated in vacuo. The residue crystallized upon digestion with ether and was then recrystallized from absolute ethyl alcohol, yielding 1-methyl-2{4-[(5-methyl-3-isoxazolyl-carbonyl)-amino] - benzyl} - 1,2-dicarbobenzoxy-hydrazine of m.p. 128–130°.

12 g. of this product were covered with 100 ml. of a 33% solution of hydrogen bromide in glacial acetic acid and the resulting mixture kept at room temperature with occasional agitation for 5 hours. The separated crystals were then filtered off, washed with glacial acetic acid and ether, and recrystallized 3 times from absolute ethanol, yielding 1-methyl-2-4-{(5-methyl-3-isoxazolyl-carbonyl)-amino]-benzyl}-hydrazine hydrobromide melting at 211° (dec.).

In an analogous manner, the following compounds were prepared:

1-methyl-2-(4 - isonicotinoylamino - benzyl) - hydrazine dihydrobromide; m.p. 231 ₄ 232° (dec.) (from water/ethanol);

1 - methyl - 2 - (4 - nicotinolylamino-benzyl)-hydrazine dihydrobromide, m.p. 210–211° (dec.) from water/ethanol);

1 - methyl - 2 - (4-benzamido-benzyl)-hydrazine hydrobromide, m.p. 184–186° (from ethanol);

1-methyl - 2 - (4-acetamido-benzyl) - hydrazine hydrobromide, m.p. 180° (from ethanol/ether).

Example 14

15 g. of 4 - [(2-methyl-1,2-dicarbobenzoxy-hydrazino) methyl]-benzoic acid were boiled with an excess of thionyl chloride for 1 hour under reflux. The unconverted thionyl chloride was distilled off in vacuo, the residue twice dissolved each time in 75 ml. of absolute benzene and then concentrated in vacuo. The so-obtained 4-[(2-methyl-1,2-dicarbobenzoxy - hydrazino) - methyl]-benzoyl chloride, a viscous light yellow oil, was dissolved in 50 ml. of absolute benzene and with stirring mixed with a solution of 4.45 g. of isopropylamine in 100 ml. of absolute benzene. By cooling, the temperature of the reaction mixture was kept below 30°. After the mixing had been completed, the reaction mixture was maintained first at room temperature for 3 hours and then for ½ hour at 40°. It was then cooled down and poured into about 100 ml. of ice water. After the addition of a mixture of methylene chloride and ether (40 ml. +200 ml.), the organic phase was separated and then washed with water, dilute hydrochloric acid, water, dilute sodium hydroxide and again with water. The solvents were then evaporated, yielding 4 - [(2-methyl-1,2-dicarbobenzoxy-hydrazino) - methyl]-benzoic acid isopropylamide as a yellow oil, which crystallized upon triturating with ether; m.p. 90–92°. This product was then covered with 70 ml. of a 33% solution of hydrogen bromide in glacial acetic acid, and then permitted to stand for 2 hours with occasional swirling, whereupon a thick slurry of crystals was formed. The precipitate was filtered off, washed with 20 ml. of glacial acetic acid and finally with ether, yielding crystals of 4-[(2-methyl-hydrazino) - methyl]-benzoic acid isopropylamide hydrobromide, which after recrystallization from methanol/ether melted at 216–217° (dec.).

The above-mentioned acid starting material was prepared as follows:

544 g. of 4-methyl-benzoic acid was boiled with 550 ml. of thionyl chloride until a clear solution was obtained. After the excess thionyl chloride was distilled off, the residue was fractionated, yielding 605 g. of 4-methyl-benzoyl chloride; b.p. 91°/9 mm. Hg., $n_D^{24}$=1.5532. This was dissolved in 550 ml. of absolute benzene and the so-formed solution added to a mixture of 248 ml. of absolute methanol and 550 ml. of absolute benzene. After the exothermic reaction had terminated, the reaction mixture was boiled for a further 20 hours, then concentrated in vacuo and the product, 4-methylbenzoic acid methyl ester, isolated by conventional means. It could be purified by distillation, and the purified product boiled at 91°/9 mm. Hg, m.p. 32°.

574 g. of this ester were dissolved in 1200 ml. of carbon tetrachloride and, while boiling and exposing to a U.V. lamp, treated dropwise with a solution of 109 ml. of bromine in 400 ml. of carbon tetrachloride. After all of the bromine had been dropped in, the mixture was heated for a further hour, concentrated in vacuo and the residue crystallized from low boiling petroleum ether, yielding as colorless fine crystals, 4-(bromo-methyl)-benzoic acid methyl ester, which melted at 52°. For the reaction of this ester with 1 - methyl-1,2-dicarbobenzoxy-hydrazine, the following procedure was followed:

309 g. of a 27% suspension of sodium hydride in an inert solvent were treated with 300 ml. of dimethylformamide, and a solution of 1095 g. of 1 - methyl - 1,2-dicarbobenzoxy-hydrazine in dimethylformamide was added thereto. When all the material had been added and the hydrogen evolution had nearly come to a standstill, the mixture was heated for an hour at about 80° in order to carry the formation of the sodium salt to completion. A mixture of 759 g. of 4-(bromo-methyl)-benzoic acid methyl ester in 700 ml. of dimethylformamide was then dropped in, and finally the reaction mixture was heated for an hour at 80°. After cooling, the reaction mixture was poured into 10 liters of ice water and the condensation products taken up in either. The thereby obtained crude methyl ester ($n_D^{24}$=1,1558) was used without further purification for the next step. It was dissolved in about 2200 ml. of dioxane, treated with a solution of 133 g. of sodium hydroxide in 870 ml. of water, and the resulting mixture stirred for about 24 hours at room temperature. It was then poured into about 10 liters of ice water and neutral materials were extracted with ether. The aqueous phase was rendered acid with concentrated hydrochloric acid (weak congo red) and the separated acid taken up in ether. The isolated crude acid was recrystallized from dibutyl ether, yielding colorless crystals of 4-[(2-methyl-1,2 - dicarbobenzoxy-hydrazino) - methyl] benzoic acid, which melted at 112°. The so-obtained product was sufficiently pure for further reaction. In a similar way, but using different amines, the following compounds were prepared:

4-[(2-methyl-hydrazino)-methyl]-benzoic acid methylamide hydrobromide, m.p. 186–187°

4-[(2-methyl-hydrazino)-methyl]benzoic acid ethylamide hydrobromide, m.p. 165–165°

4-[(2-methyl-hydrazino)-methyl]-benzoic acid n-propylamide hydrobromide, m.p. 177–178°

4-[(2-methyl-hydrazino)-methyl]-benzoic acid n-butylamide hydrobromide, m.p. 173–175°

4-[(2-methyl-hydrazino)-methyl]-benzoic acid sec.-butylamine hydrobromide, m.p. 155–156°

4-[(2-methyl-hydrazino)-methyl]-benzoic acid tert.-butylaminde hydrobromide, m.p. 200–201°

4-[(2-methyl-hydrazino)-methyl]-benzoic acid isobutylamide hydrobromide, m.p. 177–179°

4-[(2-methyl-hydrazino)-methyl]-benzoic acid isopentylamide hydrobromide, m.p. 163–164°

4-[(2-methyl-hydrazino)-methyl]-benzoic acid n-pentylamide hydrobromide, m.p. 174–175°

4-[(2-methyl-hydrazino)-methyl]-benzoic acid dimethylamide dihydrobromide, m.p. 142–145°

4-[(2-methyl-hydrazino)-methyl]-benzoic acid di-isopropylamide hydrobromide, m.p. 202–203°

4-[(2-methyl-hydrazino)-methyl]-benzoic acid pyrrolidide dihydrobromide hydrate, m.p. 139–142°

4-(2-methyl-hydrazino)-methyl]-benzoic acid piperidide oxalate, m.p. 170–172°

4-[(2-methyl-hydrazino)-methyl]-benzoic acid allylamide hydrobromide, m.p. 158–159°

4-[(2-methyl-hydrazino)-methyl]-benzoic acid (2-chloroethyl)-amide hydrobromide, m.p. 168–169°

4-[(2-methyl-hydrazino)-methyl]-benzoic acid 2-(methyl-thioethyl)-amide hydrobromide, m.p. 152–153°

4-[(2-methyl-hydrazino)-methyl]-benzoic acid-(2-methylsulfonylethyl)-amide hydrobromide, m.p. 126–128°.

Example 15

16.5 g. of 4-[(2-methyl - 1,2 - dicarbobenzoxy-hydrazino)-methyl]-benzoyl chloride were added to 100 ml. of absolute benzene and treated with 3.1 g. of cyclopropylamine hydrochloride. 7.5 g. of triethylamine and 50 ml. of benzene were then dropped into the reaction mixture at 20–30° with stirring. The reaction mixture was worked up as in Example 14, yielding 4-[(2-methyl-1,2-dicarbobenzoxy-hydrazino)-methyl]-benzoic acid cyclopropylamide, the carbobenzoxy groups of which were then removed by treatment with hydrogen bromide/ glacial acetica acid. The product, 4-[(2-methyl-hydrazino)-methyl]-benzoic acid cyclopropylamide hydrobromide, melted at 180–182°.

Example 16

Reaction of 16.5 g. of 4-[(2-methyl-1,2-dicarbobenzoxy-hydrazino)-methyl]-benzoyl chloride with morpholine according to the process of Example 14 above yielded the reaction product as a viscous yellow oil. The carbobenzoxy groups were split off by hydrogenolysis as follows: the so-obtained 4-[(2-methyl-1,2-dicarbobenzoxy-hydrazino)-methyl]-benzoic acid morpholide was dissolved in 210 ml. of methanol and after the addition of 2.1 g. of 5% palladium-carbon, hydrogenated at room temperature and atmospheric pressure. After the hydrogen uptake had come to a standstill, the catalyst was filtered off, washed with methanol, and the filtrate concentrated in vacuo. The residue was taken up in 25 ml. of methanol, treated with a solution of 4.45 g. of oxalic acid in 20 ml. of methanol, and ether added thereto until the solution became turbid. Upon cooling, 4-[(2-methyl-hydrazino)-methyl]-benzoic acid morpholide oxalate crystallized out and after recrystallization from methanol/ether melted at 142–144°.

By the same method and using 2-cyano-ethylamine, the following compound was prepared: 4-[(2-methyl-hydrazino)-methyl]-benzoic acid (2-cyano-ethyl)-amide oxalate.

Example 17

14.1 g. of 4-[(2-methyl - 1,2 - dicarbobenzoxy-hydrazino)-methyl]-benzoyl chloride in 20 ml. of benzene were added to a mixture of 13.2 g. of glycine benzylester tosylate and 100 ml. of absolute pyridine. After the mixture stood for one hour at room temperature, it was worked up in the usual manner and the crude condensation product was hydogenolysed in methanol with palladium-carbon as the catalyst. The so-obtained N-[4-[(2-methyl-hydazino)-methyl]-benzoyl]-glycine, after recrystallization from water/alcohol, melted at 209–210° (dec.).

The same product was obtained by a reaction of 4-[(2-methyl-1,2-dicarbobenzoxy-hydrazino)-methyl] - benzoic acid and glycine benzylester tosylate in methylene chloride in the presence of triethylamine and dicyclohexylcarbodiimide. After removal of the formed dicyclohexylurea by filtration under suction, the methylene chloride solution was washed with dilute hydrochloric acid and sodium bicarbonate solution, then concentrated. The product was then hydrogenolysed as described above.

Example 18

17 g. of L-glutamine 4-nitrobenzyl ester hydrobromide in 120 ml. of absolute pyridine were treated with a solution of 22 g. of 4-[(2-methyl-1,2,-dicarbobenzoxy-hydrazino)-methyl]-benzoyl chloride in 50 ml. of benzene, and then worked up as in Example 17.

During the hydrogenolysis, both the carbobenzoxy groups, as well as the 4-nitrobenzylester group, were split off and the final product N[4-[(2-methyl-hydrazino)-methyl] - benzoyl] - L - glutamine, after recrystallization from aqueous ethanol, melted at 209–210°; $[\alpha]_D = +15.8°$ (c.=1 in water).

By the above procedure, employing glycinamide or serinamide, the following compounds were prepared:

N-[4-[(2-methyl-hydrazino)-methyl-benzoyl]-glycinamide hydrochloride, m.p. 190–192°;
N-[4-[(2-methyl-hydrazino)-methyl]-benzoyl]-serinamide hydrochloride, m.p. 184–186°.

Example 19

5.75 g. of sodium and then 79 g. of 1-methyl-1,2-dicarbobenzoxy-hydrazine were dissolved in 250 ml. of absolute alcohol. The solution was evaporated to dryness in vacuo at 40° and the residue dissolved in 150 ml. of dimethylformamide. Over ten minutes, 46 g. of 4-chloromethly-thianisole were added to the solution, the temperature of the reaction mixture rising to 60°. The reaction mixture was then stirred for two hours at room temperature, poured into 1.5 liters of water and extracted with methylene chloride/ether. The extracts were washed several times with water, dried with sodium sulfate and concentrated in vacuo. The oily residue was dissolved in 400 ml. of glacial acetic acid and after the addition of 80 ml. of 30% hydrogen peroxide, heated on the steam bath for two hours. The reaction mixture was then evaporated to dryness in vacuo and the residue dissolved in 500 ml. of a 33% solution of hydrogen bromide in glacial acetic acid. After a short time, the product 1-methyl-2-(4-methylsulfonyl-benzyl)-hydrazine hydrobromide crystallized therefrom. It melted at 173–175° (dec.).

Example 20

10 g. of 4-[(2-methyl-1,2-dicarbobenzoxy-hydrazino)-methyl]-benzoyl chloride were dissolved in a mixture of 50 ml. of benzene and 10 ml. of pyridine. While stirring, this solution was treated with 8 g. of 1-methyl-2-(4-aminobenzyl)-1,2-dicarbobenzoxy-hydrazine in 30 ml. of benzene. After standing for one hour at room temperature, the reaction mixture was poured into water and extracted with methylene chloride. The methylene chloride extract was washed with sodium bicarbonate solution, dried with sodium sulfate and then concentrated. The residual viscous oil was decarbobenzoxylated with 70 ml. of a 33% solution of hydrogen bromide in glacial acetic acid. From this reaction mixture, the dihydrobromide of 4,4'-bis-[(2-methyl]-benzanhide crystanhized out. After recrystalnization from methanol, it melted at 247–248° (dec.).

Example 21

By reaction of 23.4 g. of 4-[(2-methyl-1,2-dicarbobenzoxy-hydrazino)-methyl]-benzoyl chloride with 4.85 g. of furfurylamine in a mixture of 8 ml. pyridine and 50 ml. of benzene according to the procedure of Example 15 above, followed by hydrogenolysis of the condensation product with palladium-carbon in methanol, there was obtained 4-[(2-methyl-hydrazino)-methyl]-benzoic acid furfurylamid, the oxalate of which melted at 170–171° (dec.).

In an analogous manner, there was obtained 4-[(2-methyl-hydrazino)-methyl]-benzoic acid (3-methoxy-propyl)-amide hydrochloride, m.p. 135–136°.

By employing β-phenethylamine in the condensation step, and splitting off the carbobenzoxy groups with hydrogen bromide/glacial acetic acid, there was obtained 4-[(2-methyl-hydrazino)-methyl]-benzoic acid phenethylamid hydrobmide, which, after recrystallization from ethanol/ether, melted at 180–183°.

In an analogous manner, the following compounds were obtained by using the corresponding amines:

4-[(2-Methyl-hydrazino)-methyl]-benzoic acid (3-pyridyl methyl)-amide dihydrobromide, m.p. 136–139°;
4-[(2-methyl-hydrazino)-methyl]-benzoic acid benzylamide hydrobromide; m.p. 175–177°.

Example 22

23.4 g. of 4-[(2-methyl-1,2-dicarbobenzoxyhydrazino)-methyl]-benzoyl chloride were dissolved in 60 ml. of benzene and, with stirring and cooling, added dropwise to a solution of 13.4 g. of 2-diethylamino-ethylamine in 20 ml. of benzene. The mixture was permitted to stand overnight and then partitioned between a dilute solution of sodium hydroxide and ether. The ether phase was washed thoroughly neutral with water and then extracted with ¼N hydrochloric acid. The hydrogen chloride extract was rendered strongly alkaline with sodium hydroxide, and then again extracted with ether. The ether solution was washed neutral with water, dried with sodium sulfate, and evaporated. The residual yellow oil was dissolved in 75 ml. of a 33% solution of hydrogen bromide in glacial acetic acid, and the resulting mixture permitted to stand for three hours at room temperature. It was then treated with ether, whereupon a hygroscopic salt separated out. This was separated and then dissolved in the minimum amount of water. The solution was then saturated with potassium carbonate and extracted with methylene chloride. The methylene chloride extracts were dried with potassium carbonate and concentrated. The residue was dissolved in methanol and treated with a methanolic solution of 2 equivalents of picric acid, whereupon the dipicrate of 4[(2-methyl-hydrazino)-methyl]-benzoic acid diethylaminoethylamide crystallized out. It melted at 137–139°.

In an analogous manner, then was obtained 4-[(2-methylhydrazino)-methyl]-benzoic acid dimethylaminoethylamide dihydrobromide, m.p. 131–133°.

Example 23

9 g. of ethanolamine were dissolved in a solution of 18.2 g. of sodium carbonate in 20 ml. of water. Over two hours, a solution of 65 g. of 4-[(2-methyl-1,2-dicarbobenzoxyhydrazino)-methyl]-benzoyl chloride in 150 ml. of ether was then added thereto dropwise with vigorous stirring at 0–5°. The reaction mixture was then stirred overnight at 0–5°. It was then extracted with a mixture of methylene chloride and ether, and the extract washed with water, 1N hydrochloric acid, potassium bicarbonate solution and water, dried with sodium sulfate, and evaporated. The residual 4-[2-methyl-1,2-dicarbobenzoxy-hydrazino)-methyl]-benzoic acid (2-hydroxyethyl)-amide crystallized upon trituration with ether; m.p. 74–76°. 68 g. thereof were dissolved in 210 ml. of a 33% solution of hydrogen bromide in glacial acetic acid, and the so-formed mixture permitted to stand at room temperature for 16 hours. The 4-[(2-methyl-hydrazino)-methyl]-benzoic acid (2-acetoxy-ethyl)-amide hydrobromide separated off; this hygroscopic salt melted at 119–121° (dec.). It was then filtered off, washed with acetic acid/ether (4:1), washed with ether and dissolved in the minimum amount of water. This solution was saturated with potassium carbonate and extracted with ether. An etheric picric acid was then added to the ether extract, whereupon the picrate of 4-[(2-methyl-hydrazino)-methyl]-benzoic acid (2-acetoxy-ethyl)-amide crystallized out. After recrystallization from methanol, it melted at 143–145°.

Example 24

13.5 g. of diethanolamine were dissolved in a solution of 14.5 g. of sodium carbonate in 160 ml. of water. In the course of 2 hours, a solution of 52 g. of 4-[(2-methyl-1,2-dicarbobenzoxy-hydrazino)-methyl]-benzoyl chloride in 150 ml. of ether was added thereto dropwise with vigorous stirring at 0–5°. The mixture was then stirred overnight at 0–5°. It was extracted with ethyl acetate and the ethyl acetate solution washed with sodium bicarbonate solution and sodium chloride solution, dried with sodium sulfate and evaporated. The residual viscous yellow oil was dissolved in 500 ml. of methanol and shaken with palladium-carbon in a hydrogen atmosphere until the carbobenzoxy groups had been hydrogenolyzed off. The catalyst was then filtered off, and the filtrate evaporated. The residue was dissolved in ethanol and treated wtih one equivalent of oxalic acid. Upon standing, the oxalate of 4-[(2-methyl-hydrazino)-methyl]-benzoic acid bis-(2-hydroxy-ethyl)-amide crystallized out. It melted at 145–146°.

Example 25

20 g. of 1-methyl-2-(4-aminobenzyl) - 1,2 - dicarbobenzoxyhydrazine were dissolved in 25 ml. of pyridine, and, with stirring and cooling, 6.4 g. of pivaloyl chloride in 10 ml. of benzene were added thereto dropwise. The reaction mixture was then permitted to stand overnight at room temperature, poured into 400 ml. of water, taken up in ether, and the ether solution washed with water, 3N hydrochloride acid, potassium bicarbonate solution and water, dried with sodium sulfate, and evaporated. The residual yellow oil was dissolved in 70 ml. of a 33% solution of hydrogen bromide in glacial acetic acid and permitted to stand for 3 hours at room temperature. The precipitated crystals were filtered off, washed with acetic acid/ether (4:1) and ether, and recrystallized from ethanol/ether, yielding 1-methyl-2-(4-pivaloylamino-benzyl)-hydrazine hydrobromide melting at 181–182° (dec.).

Example 26

20 g. of 1-methyl-2-(4-amino-benzyl)-1,2-dicarbobenzoxyhydrazine were dissolved in 100 ml. of 85% acetic acid. With stirring at 30–35°, a solution of 6 g. of sodium cyanate in 45 ml. of water was then added dropwise to the mixture. The reaction mixture was then stirred for 1½ hours at 50°, poured into 850 ml. of water, taken up in ether and washed with water, 3N hydrogen chloride, potassium bicarbonate solution and water. After drying with sodium sulfate, the ether was distilled off and the residual viscous oil dissolved in 70 ml. of a 33% solution of hydrogen bromide in glacial acetic acid. The so-formed mixture was permitted to stand for 4 hours. The precipitated crystals were filtered off, washed with acetic acid/ether (4:1) and ether, and recrystallized from ethanol, yielding the hydrobromide of 1-methyl-2-(4-ureido-benzyl)-hydrazine, which melted at 140–142°.

Example 27

18.9 g. of 1-methyl-2-(4-amino-benzyl) - 1,2 - dicarbobenzoxy hydrazine were dissolved in 50 ml. of ethanol, treated with one equivalent of ethanolic hydrochloric acid and 2.7 g. of cyanamide, and then boiled under reflux for 18 hours. The reaction mixture was then evaporated in vacuo, the residue dissolved in water, rendered alkaline with sodium hydroxide, and extracted with ether/methylene chloride. The extract was washed with water, dried with sodium sulfate and evaporated. The residual yellow oil was shaken overnight at room temperature with 60 ml. of a 33% solution of hydrogen bromide in glacial acetic acid. The so-formed crystals were filtered off and washed with acetic acid and ether, yielding 1-methyl-2-(4-guanidine-benzyl) - hydrazine dihydrobromide which melted at 122–125° (dec.).

Example 28

30 g. of 1-methyl-2-(4-amino-benzyl)-1,2-dicarbobenzoxyhydrazine were reacted with 9 g. of methylsulfonyl chloride according to the procedure described in Example 25. After the reaction mixture was poured into water, it was extracted with a mixture of ether and methylene chloride. It was then washed with water, 3N hydrochloric acid, potassium bicarbonate solution and water, dried with sodium sulfate and evaporated. The so-obtained residual yellow oil was dissolved in 105 ml. of 33% solution of hydrogen bromide in glacial acetic acid, and permitted to stand for 3 hours at room temperature. The precipitated crystals were isolated and purified as previously described, yielding 1-methyl-2-(4-methylsulfonylamino-benzyl)-hydrazine hydrobromide melting at 177–178°.

Example 29

106.5 g. of 4-[(2-methyl-1,2-dicarbobenzoxy-hydrazino)-methyl]-benzoyl chloride were dissolved in 400 ml. of diethylene glycol dimethylether, and, with stirring in the course of 1½ hours at −75 to −68°, treated with a suspension of 70 g. of tri-tert.-butoxy-lithium-aluminum-hydride in 400 ml. of diethyleneglycol dimethylether. The temperature of reaction mixture was then allowed to rise to 0° in the course of 1 hour and then the mixture was treated with 60 ml. of water and 25.5 ml. of 3N sodium hydroxide. After a further 1½ hours, the reaction mixture was poured into a large amount of water, acidified with hydrochloric acid and the crude aldehyde taken up in ether. The ether solution was washed three times with 3N hydrochloric acid, two times with water, four times with sodium hydroxide solution and a further three times with water, dried with sodium sulfate and concentrated, yielding crude 4-[(2-methyl - 1,2-dicarbobenzoxy - hydrazino)-methyl]-benzaldehyde. In order to split off the carbobenzoxy groups, this product was dissolved in about 40 ml. of glacial acetic acid, and to this solution were added 280 ml. of a 33% solution of hydrogen bromide in glacial acetic acid. The reaction mixture was then permitted to stand for 3 hours at room temperature. The separated crystals were filtered off with suction, washed first with glacial acetic acid and then with absolute ether, and then dried in a dessicator over potassium hydroxide, yielding 4-[(2-methyl-hydrazino)-methyl]-benzaldehyde hydrobromide melting at 127–132°.

Example 30

52 g. of the product obtained in Example 21 by the condensation of 4-[(2-methyl-1,2-dicarbobenzoxy-hydrazino)-methyl]-benzoyl chloride and furfuryl amine were hydrogenated in 300 ml. of ethanol in the presence of 6 g. of acetic acid and 1 g. of platinum until 2 equivalent amounts of hydrogen had been taken up. The catalyst was then filtered off and the solution concentrated, whereupon the residue was dissolved in 150 ml. of a 33 percent solution of hydrobromic acid in glacial acetic acid and allowed to stand for 3 hours. The crystallized product was filtered off, washed with glacial acetic acid and ether and recrystallized from a mixture of methanol, acetonitrile and ether, yielding 4-[(2-methyl-hydrazino)-methyl]-benzoic acid tetrahydrofurfuryl-amide dihydrobromide melting at 124–125°.

Example 31

23.8 g. of 4-[(2-methyl-1,2-dicarbobenzoxy-hydrazino)-methyl]-benzoic acid (2-hydroxy-ethyl)-amide obtained according to Example 23) were dissolved in 240 ml. of methanol and shaken in a hydrogen atmosphere together with 5 g. of palladium-carbon until the carbobenzoxy groups were hydrogenated off. The catalyst was then filtered off and the filtrates were concentrated. The residue was dissolved in 20 ml. of ethanol and treated with 1 equivalent of 25 percent alcoholic hydrochloric acid. On diluting with acetonitrile, the 4-[(2-methyl-hydrazino)-methyl]-benzoic acid (2-hydroxy-ethyl)-amide hydrochloride crystallized, which melted at 150–152 after recrystallization from methanol/acetonitrile.

Example 32

87.5 g. of 4-[(2-methyl-hydrazino)-mtehyl]-benzoic acid isopropylamide hydrobromide (obtained according to Example 14) were dissolved in 550 ml. of water. To this solution, there was added 1000 ml. of methylene chloride and, while cooling with ice and stirring under nitrogen atmosphere, 1200 g. of potassium carbonate portionwise. The methylene chloride layer was separated and the aqueous slurry extracted three times with 500 ml. of methylene chloride in a nitrogen atmosphere. The united methylene chloride extracts were concentrated in vacuo. The residue was dissolved under nitrogen in 100 ml. of methanol and treated, while cooling with ice, with 40 ml. of a 45% methanolic hydrochloric solution, which induces immediate crystallization. The crystals were filtered off and recrystallized from methanol, yielding 4-[(2-methyl-hydrazino)-methyl]-benzoic acid isopropylamide hydrochloride melting at 223–226°.

Example 33

A solution of 15.5 g. of 4-[(2-methyl-1,2-dicarbobenzoxy-hydrazino)-methyl]-benzoyl-chloride in 50 ml. of methyl chloride was poured, while stirring, to a solution of 2-(N-carbobenzoxy-methylamino)-ethylamine in 50 ml. of methylene chloride and 3.5 g. triethylamine. The mixture was stirred for 3 hours at room temperature and for 30 minutes at 40°, then poured onto water. The methylene chloride layer was separated and washed with 1N hydrochloric acid and with water. The methylene chloride solution was dried and concentrated and the residue dissolved in 75 ml. of a 33% solution of hydrobromic acid in glacial acetic acid and allowed to stand for 3 hours. The crystals formed were filtered off, washed with glacial acetic acid and ether, and recrystallized from ethanol, yielding 4-[(2-methyl-hydrazino)-methyl]-benzoic acid (2-methylaminoethyl)-amide dihydrobromide melting at 166–168°.

The 2-(N-carbobenzoxy-methylamino)-ethylamine was prepared as follows :

20 g. of 2-methylamino-ethylamine in 100 ml. of absolute benzene was stirred with 28.7 g. of benzaldehyde. The mixture warmed up somewhat and became yellow. The benzene was evaporated in vacuo and the residue distilled under reduced pressure in a Hickmann-flask. After a little forerun, the desired fraction distilled at 106–107°/13 mm. The N-benzyliden-N'-methylethylene diamine was obtained as a colorless oil of $n_D^{22}=1,5452$ and a U.V.-absorption maximum at 245 m$\mu$. 25 g. of this product were dissolved in 150 ml. methylene chloride and thereto were added 16.5 g. of triethylamine and while stirring and cooling in an ice bath, 26.7 g. of carbobenzoxy chloride in 100 ml. of methylene chloride in such a way that the temperature did not rise over 20°. The mixture was stirred for 3 hours at room temperature and shaken with 100 ml. of water. The methylene chloride layer was washed three times with water and concentrated in vacuo. The yellow oil obtained was well mixed with 100 ml. of ether and 100 ml. of 6N sulfuric acid for one hour at room temperature. The layers were separated, the aqueous layer extracted five times more with 30 ml. ether each time. To this ether extracts were added, while cooling on an ice bath, 50 g. of solid potassium hydroxide. The oily product was extracted with methylene chloride, the extract concentrated and the residue distilled under reduced pressure. The desired product distilled, after a short forerun, at 105–112°/0.04 mm. as a colorless oil of $n_D^{24}=1.5355$.

Example 34

7.4 g. of methyl urea, 46.7 g. of 4-[(2-methyl-1,2-dicarbobenzoxy-hydrazino)-methyl]-benzoyl chloride 8 g. of pyridine and 200 ml. of benzene were mixed and refluxed for 8 hours. After cooling down, the mixture was poured onto water and extracted with an ether/methylene chloride mixture. The extract was washed with water, with 1N hydrochloric acid and again with water, dried over sodium sulfate and freed of the solvent by distillation. The residue crystallized upon triturating with methanol. The crystals were filtered off and dried, yielding 1-methyl-2-[4-(4 - methyl-allophanoyl)-benzyl]-1,2-dicarbobenzoxy-hydrazine melting at 141–142°. 25 g. thereof were dissolved in 50 ml. of glacial acetic acid and to it were added 100 ml. of a 33 percent solution of hydrobromic acid in glacial acetic acid. After 4 hours standing, the crystals formed were filtered off, washed with glacial acetic acid and ether, and recrystallized from methanol, yielding 1-methyl-[4 - (4 - methyl-allophanoyl)-benzyl]-hydrazine hydrobromide of melting point 183–183.5°.

In an analogous manner, the following products were obtained:

1-methyl-2-(4 - allophanoyl-benzyl)-hydrazine hydrobromide, melting point 203–204°;
1-methyl-2-[4-(4 - ethyl-allophanoyl)-benzyl]-hydrazine hydrobromide, melting point 193–194°;
1-methyl-2-[4-(4 - butyl-allophanoyl)-benzyl]-hydrazine hydrobromide, melting point 171–172°.

Example 35

A suspension of 21.5 g. of sodium hydride in 80 ml. of dimethylformamide was added slowly, while stirring to a solution of 281 g. of 1-methyl-1,2-dicarbobenzoxy-hydrazine in 300 ml. of dimethylformamide. After the evolution of hydrogen had subsided, there was added to the reaction mixture a solution of 167 g. of 4-(bromoethyl)-benzonitrile in 200 ml. of dimethylformamide and the mixture was then heated for one hour at 80°. The solvent was then almost completely distilled off in vacuo, the residue triturated with water and extracted with ether. The ether extract was washed with water, dried and concentrated. By recrystallization from dibutylether, there was obtained the 4-[(2 - methyl-1,2-dicarbobenzoxy-hydrazino)-methyl]-benzonitrile melting at 68°.

43 g. of the above compound were mixed with 50 ml. of glacial acetic acid and 7.5 g. of tertiary butanol. Thereto were added dropwise, while stirring and cooling with ice to 0–5° 5.6 ml. of concentrated sulfuric acid. The ice bath was then taken away and the mixture was stirred until homogeneous. It was then allowed to stand for 15 hours at room temperature, poured onto ice, extracted with ether and the ether extract was washed until neutral with water and 5% sodium carbonate solution. After drying over sodium sulfate, the ether was distilled off. The residue, 4 - [(2 - methyl-1,2-dicarbobenzoxy-hydrazino)-methyl]-benzoic acid tert. butylamide, was dissolved in 150 ml. of a 33% solution of hydrogen bromide in glacial acetic acid and allowed to stand for 2 hours at room temperature. The crystallized salt that separated was filtered off and washed with glacial acetic acid/ether (4:1) and with ether. By recrystallization from methanol/acetonitrile/ether, there was obtained the 4-[(2-methyl-hydrazino)-methyl]-benzoic acid tert. butylamide hydrobromide melting at 200–201°.

Example 36

21.5 g. of 4-[(2-methyl - 1,2 - dicarbobenzoxy-hydrazino)-methyl]-benzonitrile were dissolved in 70 ml. of a 33% solution of hydrogen bromide in glacial acetic acid, and allowed to stand for 20 hours at room temperature. The crystallized product was filtered off, washed with ether and recrystallized from alcohol, yielding 4-[(2-methyl - hydrazino) - methyl]benzamide hydrochloride melting at 173–175°.

Example 37

15.8 g. of 4-[(2-methyl-1,2-dicarbobenzoxy-hydrazino)-methyl]-benzoyl-chloride were dissolved in 50 ml. of methylene chloride and, while stirring, added dropwise to a solution of 6.2 g. of 2-amino-1-butanol in 50 ml. of methylene chloride. Stirring was continued for 2 more hours at room temperature and 30 minutes at 40°, whereupon 50 ml. of water were added to the solution, which was then worked up according to Example 14. The yellowish glassy material obtained was dissolved in 200 ml. of methanol, shaken with 2 g. of 5 percent palladium carbon in a hydrogen atmosphere, whereby ⅔ of the calculated amount of hydrogen had been absorbed after about 6 hours. The solution was then filtered and the filtrate concentrated in vacuo. The colorless residue was dissolved in 50 ml. of methanol and to it was added a solution of 3.2 g. of anhydrous oxalic acid in 25 ml. of methanol. Upon addition of some ether, a salt precipitated, which was recrystallized from ethanol/acetonitrile, yielding 4-[(2-methyl-hydrazino)-methyl]-benzoic acid (1-hydroxymethylpropyl)-amide oxalate melting at 141–143° (dec.).

Example 38

15.8 g. of 4-[(2-methyl-1,2-dicarbobenzoxy-hydrazino)-methyl]-benzoylchloride were dissolved in 50 ml. of dry ether and, wherein 30 minutes within stirring, added dropwise to a solution of 3.3 g. of 2-amino-2-methyl-1-propanol and 3.6 g. of anhydrous sodium carbonate in 50 ml. of water. The solution was stirred overnight at 0°, the mixture diluted with 100 ml. of water and extracted three times with 100 ml. of methylene chloride each time. The united methylene chloride extracts were freed off the solvent in vacuo and the residue dissolved in 200 ml. of methanol, whereupon it was hydrogenated in the presence of 2 g. of 5% palladium carbon. The colorless glacial material was transformed according to Example 37 into its oxalic acid salt. The crystalline crude material was recrystallized from methanol/acetonitrile, yielding 4-[(2-methyl-hydrazino)-methyl]-benzoic acid (1,1-dimethyl-2-hydroxyethyl)-amide oxalate as colorless platelets melting at 160–162° (dec.).

Example 39

The condensation product obtained in Example 38 from 4 - [(2 - methyl - 1,2 - dicarbobenzoxy-hydrazino)-methyl]-benzoyl-chloride and 2-amino-2-methyl-1-propanol gave, upon treatment with hydrogen bromide in glacial acetic acid and subsequent precipitation with ether, an amorphous material that was dissolved in 50 ml. of water. To this solution were added 300 ml. of methylene chloride and, while cooling with ice under nitrogen, 150 g. of anhydrous potassium carbonate. The solution was well stirred, the organic phase decanted and the aqueous phase extracted three times with 300 ml. of methylene chloride each time. The united methylene chloride extracts were dried over potassium carbonate and the solvent was evaporated off. The residue was dissolved in 20 ml. of ethanol and to the mixture was immediately added a solution of 5 g. of anhydrous oxalic acid in 20 ml. of ethanol. Upon addition of a little ether, the 4-[(2 - methyl-hydrazino)-methyl]-benzoic acid (1,1 - dimethyl - 2 - acetoxy-ethyl)-amide oxalate formed colorless crystals melting at 116–126° (dec.) after 2 recrystallizations from ethanol.

Example 40

15.8 g. of 4-[(2-methyl-1,2-dicarbobenzoxy-hydrozino)-methyl]-benzoyl chloride were dissolved in 50 ml. of methylene chloride. This solution was added, while stirring, dropwise to a suspension of 12.6 g. of 2-hydroxy-3,3,3-trichloro-propylamine in 150 ml. of methylene chloride. Stirring was continued for 2 hours at room temperature and 30 minutes at 40°, whereupon 50 ml. of water were added thereto. The product was worked up according to Example 14 and treated with hydrogen bromide in glacial acetic acid. The crystalline crude material was recrystallized from ethanol/acetonitrile/ether, yielding 4 - [(2 - methyl-hydrazino)-methyl]-benzoic acid [2 - hydroxy-3,3,3-trichloropropyl]-amide hydrobromide melting at 187–189° (dec.).

Example 41

6.4 g. of phosphorous pentachloride were suspended in 100 ml. of dry benzene. To this suspension was added, while stirring, a solution of 4-[(2-methyl-1,2-dicarbobenzoxy-hydrazino)-methyl]-benzoic acid isopropylamide in 50 ml. of dry benzene. After 30 minutes, the solution became yellow and was concentrated in vacuo at 60°. The residue was treated with 1.8 g. of isopropylamine in 50 ml. of dry benzene and the mixture was heated to 60° for 2 hrs. After evaporating off the solvent, there was obtained a yellow glacial material that was taken in 80 ml. of a 33% solution of hydrogen bromide in glacial acetic acid. The product went into solution after short stirring, and after about 30 minutes crystallization began. After 1 hour standing at room temperature, the solid material was filtered off and recrystallized from glacial acetic acid yielding 1-methyl-2-[4-(N,N'-diisopropylamidino)-benzyl]-hydrazine dihydrobromide as slightly hygroscopic colorless prisms of melting point 128–133° (dec.).

Example 42

55.5 g. of 1-methyl-2-(4-amino-benzyl)-1,2-dicarbobenzoxy-hydrazine were dissolved in 250 ml. of absolute benzene. To this solution were added while stirring, 14.5 g. of N-butyl-isocyanate and the reaction mixture heated for 5 hours at 55°, whereupon the benzene was distilled off in vacuo. The residue was dissolved in ether and the ether solution washed with 3N hydrochloric acid and with water, dried with sodium sulfate and concentrated. The viscous oily residue was dissolved in 200 ml. of a 33% solution of hydrogen bromide in glacial acetic acid, whereupon crystallization soon began. After 2 hours standing, the crystals were filtered off, washed with glacial acetic acid/ether (4:1) and with ether, and recrystallized from isopropanol, yielding 1-methyl-2-[4-(3-n-butyl-ureido)-benzyl]-hydrazine hydrobromide melting at 168–169°.

In an analogous manner, but using isopropylisocyanate, there was obtained:

1-methyl-2-[4-(3-isopropyl-ureido)-benzyl]-hydrazine-hydrobromide, melting at 171–173°.

Example 43

42 g. of 4-[(2-methyl-1,2-dicarbobenzoxy-hydrazino)-methyl]-benzoic acid azide, which had been prepared in usual manner from 4-[(2-methyl-1,2-dicarbobenzoxy-hydrazino)-methyl]-benzoyl chloride and sodium azide, were heated in 170 ml. of toluene to 100° until the evolution of nitrogen had subsided. The residue obtained after distilling off the toluene in vacuo was recrystallized from dibutyl ether yielding 1-methyl-2-(4-isocyanato-benzyl)-1,2-dicarbobenzoxy-hydrazine of melting point 55–57°.

This product was dissolved in 100 ml. of absolute benzene and to this solution was added, while stirring at 0-10°, a solution of 2.85 g. of 2-hydroxy-ethylamine in 10 ml. of absolute benzene. The reaction mixture was then heated for 5 hours to 55°, whereupon it was concentrated in vacuo. The residue was dissolved in ether/methylene chloride (2:1), washed successively with 3N hydrochloric acid, saturated potassium hydrogen carbonate solution and with water and dried over sodium sulfate. The residue obtained after distilling off the dissolvents was dissolved in 300 ml. of methanol, then shaken with palladium carbon in hydrogen atmosphere until the carbobenzoxy group was split off. One equivalent amount of alcoholic hydrochloric acid was added to the hydrogenation mixture, which was then concentrated to a small volume, yielding 1 - methyl - 2 - [4 - [3 - (2 - hydroxyethyl)-ureido]-benzyl]-hydrazine hydrochloride melting at 160-162°.

What is claimed is:
1. A compound of the formula

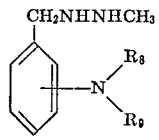

wherein $R_8$ is hydrogen and $R_9$ is selected from the group consisting of guanyl methylguanyl, isopropylguanyl and hydroxyethylguanyl, or a salt thereof of a pharmaceutically acceptable acid.

2. A compound in accordance with claim 1, 1-methyl-2-(4-guanidino-benzyl)-hydrazine.

References Cited
UNITED STATES PATENTS
3,117,994  1/1964  McKay et al. _____ 260—565

BERNARD HELFIN, Primary Examiner

G. A. SCHWARTZ, Assistant Examiner

U.S. Cl. X.R.
260—343.7, 501.14